United States Patent [19]
Carter et al.

[11] Patent Number: 6,064,817
[45] Date of Patent: *May 16, 2000

[54] COMPILER-ASSISTED OR INTERPRETER-ASSISTED SOLUTION TO THE YEAR 2000 PROBLEM FOR COMPUTER PROGRAMS

[75] Inventors: William Augustus Carter, Georgetown, Ky.; Alan Roeder Elderon, Mountain View, Calif.; Timothy David Magee, Lexington; Mark David Nicholas, Georgetown, both of Ky.; Henry Y. Saade, San Jose, Calif.; Grant Sutherland, Cottesloe, Australia; William Nicholas John Tindall, San Martin, Calif.; Jeffrey Ramesh Urs, Nicholasville; Timothy Edward Weinmann, Lexington, both of Ky.; Michael Thomas Wheatley, San Jose, Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/971,072

[22] Filed: Nov. 14, 1997

Related U.S. Application Data

[63] Continuation-in-part of application No. 08/899,444, Jul. 23, 1997.

[51] Int. Cl.[7] ........................................... G06F 9/45
[52] U.S. Cl. .............................. 395/705; 395/708; 707/6; 707/101
[58] Field of Search ................................... 395/705, 708; 707/6, 101

[56] References Cited

U.S. PATENT DOCUMENTS

| | | | |
|---|---|---|---|
| 5,065,400 | 11/1991 | Masuishi et al. | 395/703 |
| 5,307,498 | 4/1994 | Eisen et al. | 395/704 |

(List continued on next page.)

FOREIGN PATENT DOCUMENTS

| | | |
|---|---|---|
| 9151894 | 3/1991 | Japan . |
| 91177982 | 7/1991 | Japan . |
| 8006925 | 1/1996 | Japan . |

OTHER PUBLICATIONS

Pietrucha, B.; "White Paper Eyes Dynamic Centuries as Year 2000 Fix"; Newbytes. NLDB [online]: Newsbytes News Network [retrieved on Jul. 14, 1999]. Retrieved from STN International. Accession No. 97:225491, Jun. 1997.

(List continued on next page.)

*Primary Examiner*—Tariq R. Hafiz
*Assistant Examiner*—Brian Sattizahn
*Attorney, Agent, or Firm*—Pretty, Schroeder & Poplawski, P.C.

[57] ABSTRACT

A method, apparatus, and article for solving the year 2000 problem involves limited modifications in the data definition portions of the source code and compiler or interpreter support for processing the modified source code. Fields in the source code that contain a year or date values are identified and, for each such field, the user selects an appropriate technique (for example, expansion, compression or windowing). The user modifies the data definition for each identified field, by adding new attributes to request the selected technique. The user then compiles or interprets the program and resolves any ambiguous references to the variables whose definitions were modified. This procedure is applied, module by module, and each processed module is merged into production, after testing, by using a compiler option to disable the use of the new attributes. A compiler or interpreter option provides for the generation of debugger hooks for each statement that has been affected by modified declarations, which may be used with a suitably equipped debugger or other run-time analysis tool.

21 Claims, 2 Drawing Sheets

U.S. PATENT DOCUMENTS

| | | | |
|---|---|---|---|
| 5,600,836 | 2/1997 | Alter | 395/612 |
| 5,630,118 | 5/1997 | Shaughnessy | 395/601 |
| 5,644,762 | 7/1997 | Soeder | 395/606 |
| 5,668,989 | 9/1997 | Mao | 707/101 |
| 5,742,828 | 4/1998 | Canady et al. | 395/708 |
| 5,758,336 | 5/1998 | Brady | 707/6 |
| 5,758,346 | 5/1998 | Baird | 707/101 |
| 5,794,048 | 8/1998 | Brady | 395/705 |
| 5,808,889 | 9/1998 | Burgess | 364/737 |
| 5,809,500 | 9/1998 | Nolan | 707/6 |
| 5,838,979 | 11/1998 | Hart et al. | 395/707 |
| 5,852,824 | 12/1998 | Brown | 707/6 |
| 5,878,422 | 3/1999 | Roth et al. | 707/100 |
| 5,915,116 | 6/1999 | Hochman et al. | 395/705 |
| 5,930,782 | 7/1999 | Shaughnessy | 707/1 |
| 5,950,197 | 9/1999 | Beam | 707/6 |
| 5,956,510 | 9/1999 | Nicholas | 395/701 |

OTHER PUBLICATIONS

Lefkon, D.; "Seven Work Plans for Year–2000 Upgrade Projects"; Communications of the ACM; vol. 40, No. 5, pp. 111–113, May 1997.

Newcomb, P.; Scott, M.; "Requirements for Advanced Year 2000 Maintenance Tools"; Computer; IEEE Computer Society; pp. 52–57, Mar. 1997.

Zvegintzov, N.; "A Resource Guide to Year 2000 Tools"; Computer; IEEE Computer Society; pp. 58–63, Mar. 1997.

Martin, R.; "Dealing with Dates: Solutions for the Year 2000"; Computer; IEEE Computer Society; pp. 44–51, Mar. 1997.

Hart, J., Pizzarello, A., "A Scaleable, Automated Process for Year 2000 System Correction", Proceedings of the 18th International Conference on Software Engineering, pp. 475–484, 1996.

"The Year 2000 and 2–Digit Dates: A Guide for Planning and Implementation", IBM Corporation, pp. 4–1–4–13, May 1996.

MatriDigm™ Corporation News Release "MatriDigm™ Announces Key Patent Filings," Oct. 29, 1996.

Millennium Dynamics, Inc., "Summary of Products and Services" (undated).

Brochure: "Micro Focus Challenge 2000" (undated).

"Automated Year 2000 Conversion of COBOL Prorams" by Dr. Emma Teodoro, President, STA Inx. (undated).

STA America brochure, "FIELDEX: The Indispensable Time & Money Saving Software Tool For Century Change Projects".

Data Integrity, Inc. "Solutions for year 2000 computing problems" (undated).

Edge Information Group, "Guide International Survey of Year 2000 Tools" Apr. 1997.

DIALOG Search result: Cayenne Software's "Cayenne 2000 and Intersolv's Manage2000" Dec. 1996.

DIALOG search result: "Seec Inc. of US Launches Year 2000 Software In India" Oct. 29, 1996.

DIALOG search result: "DB–Net moves into the new millenium" Jul. 1996.

DIALOG search result: "The millennium mess (Year 2000 conversion project)" from Industry Trend or Event, Jan. 1996.

DIALOG search result: "Countdown To The Year 2000— Object–oriented Cobol may help solve the legacy problem that programmers will face in the comming millennium," by Edmund c. Arranga, Informationweek, Jul. 15, 1996.

DIALOG search result: "Technology Overview—Solving The Year 2000 Problem—Various products and services can help you plan and manage the project" by C. Lawrence Meador, Informationweek, Feb. 5, 1996.

DIALOG search result: "Everybody knows about the year 2000 problem, but The Equitable decided to . . . " byline by Robert L. Scheier, Computerworld, Mar. 25, 1996.

RD 265052 May 10, 1986.

DIALOG search result: "Year 2000 Software Solution Patent Application Filed by International Veronex Resources" Newswire, filed by International Veronex Resources, Aug. 13, 1997.

DIALOG search result: "B–Tree Systems (TM) Inc. Answers Year 2000 Problem for Embedded Applications," Newswire, Aug. 11, 1997.

DIALOG search result: "MCI Systemhouse Aligns with Intersolv to Extend Comprehensive Year 2000 Solutions for Buisness," Newswire, Aug. 4, 1997.

DIALOG search result: "EDS Offers solutions to Y2K conversion," PC Week, Jul. 21, 1997.

DIALOG search result: "Reasoning partners with EDS to provide comprehensive Year 2000 solutions and services; Reasoning expands global alliances and delivers second- –generation Year 2000 solutions for EDS' growing Year 2000 business" Business Wire Jun. 23, 1997.

DIALOG search result: Article "Tool Vendors Search For Ways To East Year–2000 Solutions At Software Productivity Group Year–2000 Conference," InfoWorld, Jun. 30, 1997.

DIALOG search result: "CA Announces CA–FIX/2000 To Provide Automated Remediation Of COBOL Applications For New Millenium," Business Wire, Jun. 23, 1997.

DIALOG search result: "Computer Horizons Now Offers Licenses Independent of Services for Signautre 2000 Software Toolset," Business Wire, Jun. 26, 1997.

DIALOG search result: NeoMedia Adds Year 2000 Tools for IBM VSE Market, Business Wire, Jun. 13, 1997.

DIALOG search result: "NeoMedia Opens European Office to Market Year 2000 Legacy Products," Business Wire, Jun. 30, 1997.

Article: "Management Issues For Year 2000 System Conversions," Gary M. Ross, Enterprise Systems Journal, Apr. 1997.

Article: "Year 2000 Analysis: Gaining Maximum Value From The Process," Fred Schuff, Enterprise Systems Journal, Mar. 1997.

COMPILER-ASSISTED OR INTERPRETER-ASSISTED SOLUTION TO THE YEAR 2000 PROBLEM FOR COMPUTER PROGRAMS

RELATED APPLICATIONS

This invention is a Continuation In Part of co-pending application Ser. No. 08/899,444, filed Jul. 23, 1997, and the contents of this application is incorporated by reference herein.

BACKGROUND OF THE INVENTION

1. Field of the Invention

The present invention relates generally to computer-implemented compilers or interpreters for high-level programming languages and their associated run-time environments, and in preferred embodiments, to a computer-implemented method, apparatus, and article of manufacture for solving the Year 2000 problem using a compiler or interpreter.

2. Description of the Related Art

Computer systems used in various processing applications, such as, for example, processing insurance information, account information, inventory information, investment information, retirement information, as well as many other applications, often operate with records and data containing date-dependent information. In many computing systems, date information relating to years has typically been represented in two-digit year formats, where two digits represent a year between 1900 and 1999. Thus, for example, the two digits "97" would represent the year 1997. Popular usage of this simplified date information format throughout the computer industry has resulted in an industry-recognized problem, often referred to as "the year 2000 problem."

More specifically, as a result of this simplification of date information, upon the turn of the century (i.e., upon the year 2000), two-digit year information intended to represent a year within the 21st century will, instead, be indistinguishable by computer systems from a year within the 20th century (i.e., between 1900 and 1999). Thus, for example, a two-digit year value of "08" which is intended to represent the year 2008 will be indistinguishable from the year 1908 by such computer systems.

Various solutions to the "year 2000 problem" have been suggested. However, previously proposed manners of implementing such solutions have been tedious, expensive and error-prone, rendering such implementations economically impractical in many contexts.

For example, three widely recognized techniques to address the year 2000 problem are: expansion, windowing, and compression. The expansion technique, in general, involves a conversion of 2-digit years to 4-digit years. This solves the problem of ambiguity. However, because the size of the field is larger after expansion, prior proposals to implement this technique have required modifications to application logic, data files, and databases, etc. (including backup copies). In addition, processing routines involving date information would have to be rewritten to accommodate four-digit year data. The costs and conversion time associated with such modifications can eliminate this as a practical option.

According to the windowing technique, a 2-digit year field is interpreted as a year within a 100 year window of time. In the past, the year values, ranging from 0 to 99, were interpreted within the 100 year window of 1900 to 1999. The windowing technique simply allows the programmer to specify a window with a set of values different than from 1900 to 1999, for example, from 1960 to 2059. In the simple form of this technique, a single window is used for all windowed items in the executable module.

In addition to this "single" window technique, multiple windows may be supported by allowing different window values to be defined for each program variable in the source module. For example, values representing birth dates ranging from 1920 to the present may coexist in a module with values representing retirement dates ranging from 1960 to 2059. Multiple windows provide a significant additional capability in terms of flexibility and power.

This fixed windowing technique can be extended to a "sliding" window concept. In this implementation, the window is defined as an offset from the current year. For example, an item could be defined as windowed from 30 years prior to the current year to 69 years after the current year so that in 1997 the window would be from 1967 to 2066. Another windowing technique involves a "variable window" which may be changed each time a program is run, rather than fixed when the program is compiled. Windowing does not require changes to date data in databases and in other recorded media. However, prior windowing proposals required changes to program logic (typically in source programs) which, in the past, was accomplished by modifying each instance in a source code in which date information is used. Tools, such as Vantage YR2000™ from Millennium Dynamics, FIELDEX™ from STA America and 2000-Resolve™ from Micro Focus, have been developed to help analyze and modify source code statements. However, such source code modifications tend to increase the complexity of the source code, make debugging operations more difficult and, in some cases, increase the propensity for errors.

According to compression techniques, values greater than 99 are stored in the same space previously used to store two-digit year values. One previous manner proposed for implementing this function involved changing the datatype, for example, from character to binary, thus allowing values as large as 32,767 in the same two-byte field. However, such prior proposals require changing all recorded data to the new datatype, as well as changing program data declarations and, in some cases, program logic. Procedures for effecting such changes can be relatively complex, time consuming and error prone.

Therefore, although techniques have been developed for addressing the year 2000 problem, there is still a need in the art for a method which allows the problem to be addressed in an economical and practical manner.

As discussed in more detail below, embodiments of the present invention relate to a manner of addressing the year 2000 problem, using a compiler. A compiler is a computer program that translates a source program into an equivalent object program. The source language is typically a high-level language like COBOL, PL/I, C++, and the object language is the assembly language or machine language of some computer. The translation of the source program into the object program occurs at compile time; the actual execution of the object program occurs at run-time.

A compiler must perform an analysis of the source program and then it must perform a synthesis of the object program, wherein it first decomposes the source program into its basic parts, and then builds the equivalent object program parts from the source program parts. As a source program is analyzed, information is obtained from declarations and procedural statements, such as loops and file I/O statements.

Compilers for the COBOL, PL/I, and C++ programming languages are well known in the art. In addition, run-time environments for COBOL, PL/I, or C++ based computer programs are also well known in the art.

Further embodiments of the present invention relate to a manner of addressing the year 2000 problem, using an interpreter, as opposed to a compiler. An interpreter is a program that interprets source code and, with the computer, performs computations directly, as opposed to a compiler that processes the source code and turns it into object or compiled code, that in turn performs computations when it is subsequently executed.

SUMMARY OF THE DISCLOSURE

The present invention relates generally to a method, apparatus, and article of manufacture for solving the year 2000 problem using a compiler or interpreter, and computer systems employing the same.

It is an object of preferred embodiments of the present invention to provide such a method, apparatus, and article of manufacture, in which required modifications to the source code are minimized.

It is an object of further preferred embodiments to provide such a method, apparatus and article, which may utilize windowing, field expansion and compression techniques.

It is an object of yet further preferred embodiments to allow a flexible and comprehensive mixing of windowing, expansion and compression techniques within a program.

It is an object of yet further preferred embodiments to ease the implementation of the windowing, expansion and compression techniques by limiting, in the majority of cases, the modifications required in the source code to only modifications of data definition statements. These data definitions, suitably modified, make it possible in yet further preferred embodiments, for the compiler to generate the desired code, in most situations, and to flag ambiguous statements where they occur. In further preferred embodiments, the compiler flags every statement that has been affected by the modified definitions, to provide the programmer with additional information on the resulting changes and the ability to insert other directives, functions, or code modifications, if desired.

In yet further preferred embodiments, similar functions are performed by an interpreter that interprets the source code (or a tokenized form of the source code) and performs the computations requested by the source code modifications directly, as opposed to generating an object code that in turn performs the requested computations when it is subsequently executed.

It is an object of yet further preferred embodiments to provide a run-time analysis capability that can be used, in conjunction with a debugger or other run-time analysis tool, to track the actual run-time usage of data items whose definition has been modified to address the year 2000 problem. This analysis could be used to identify usage patterns, masks, etc. which may not be obvious from static analysis techniques.

It is an object of yet further embodiments to minimize the testing impact by minimizing user changes to program logic.

It is an object of yet further embodiments to provide the capability to convert existing code to be year 2000 capable, while, at the same time, maintaining and enhancing this code for normal day-to-day operations.

It is an object of yet further embodiments to provide a "disable" option, so that required changes can be made piecemeal, and disabled, so that the code may execute as it had prior to the conversion process, until conversion and testing is completed.

It is an object of yet further embodiments to provide a size error option, for handling events that involve storing year or date data that is larger than or otherwise incompatible with the field allotted for the data.

It is an object of yet further embodiments to provide an enhanced compiler or interpreter with a set of intrinsic functions (COBOL) or built-in functions (PL/I) which may be used by a programmer to resolve ambiguous statements or operate the program in a prescribed manner.

These and other objects are accomplished according to preferred embodiments, wherein a method, apparatus, and article of manufacture for solving the year 2000 problem involves limited source code modifications in the data definition portions of the code and compiler or interpreter support for processing the modified source code.

Minimizing the source code modifications to, primarily, data definitions statements (or declarations) can significantly reduce the cost, conversion time and error rate typically associated with the implementation of a year 2000 solution. Indeed, such limited source code modifications may be made with the aid of conventional analysis tools to identify fields in the source code that contain a year value. For each of these fields, the programmer selects an appropriate technique (for example, expansion or windowing). The data definition for each identified field is then modified, by adding new attributes to request the selected technique. The program is then compiled (or interpreted), using a set of desired compiler (or interpreter) options, and any ambiguous references to the variables whose definitions were modified in the previous step are identified and/or flagged.

In preferred embodiments, this process is applied on a module by module basis and each processed module is merged into production, after minimal testing, by using a compiler (or interpreter) option to disable the use of the new attributes.

In yet further preferred embodiments, additional run-time analysis may be conducted to validate the decisions and identify possible run-time conflicts. Thus, according to such preferred embodiments, a compiler (or interpreter) option provides for the generation of debug hooks for each statement that has been affected by the modifications to the data definition statements, thus allowing use of a debugger or other analysis tool at run-time to assist with run-time analysis and validation of the application.

In yet further preferred embodiments, a compiler (or interpreter) option allows the user to selectively enable or disable the new attributes, to test the modified program while disabling the new attributes, or to compile (or process with an interpreter) and test any executable with full Year 2000 support by enabling the use of the new attributes.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which are shown, by way of illustration, several embodiments of the present invention. It is understood that other embodiments may be utilized and structural changes may be made without departing from the scope of the present invention.

OVERVIEW

The present invention relates to a method, apparatus, and article of manufacture for solving the year 2000 problem in computer programs using, in preferred embodiments, compiler directives and options, decorated data definition statements, a set of intrinsic functions and a set of compiler and run-time library enhancements.

HARDWARE ENVIRONMENT

Figure 1:
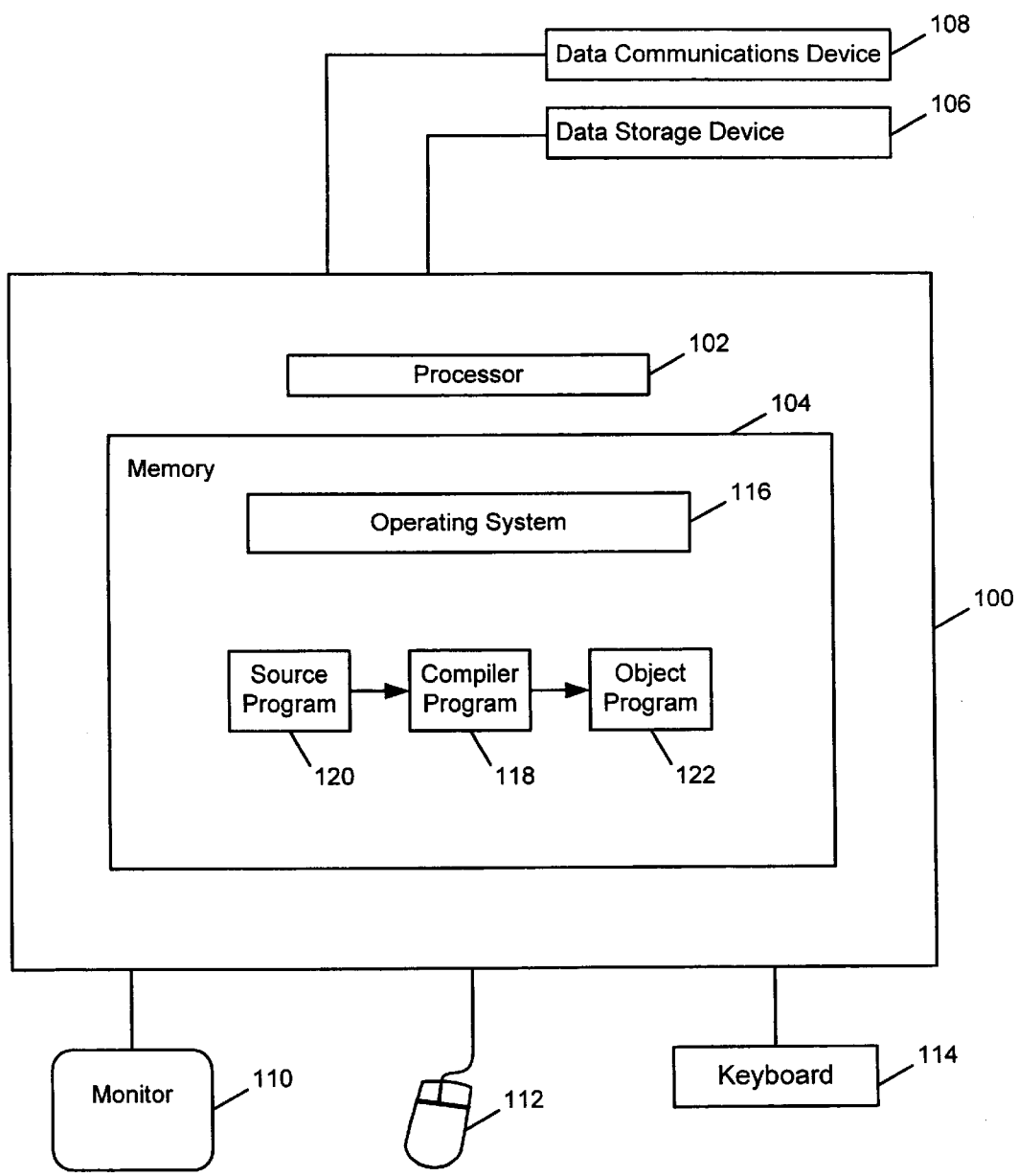
FIG. 1 is an exemplary hardware environment used to implement the preferred embodiment of the invention.

FIG. 1 is an exemplary hardware environment used to implement preferred embodiments of the invention. Embodiments of the present invention may be implemented using a computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that, attached to the computer 100 may be other devices such as read only memory (ROM), a video card, bus interface, printers, etc. Those skilled in the art will recognize that any combination of the above components, or any number of different components, peripherals, and other devices, may be used with the computer 100.

The computer 100 usually operates under the control of an operating system 116, such as OS/2™, Windows95™, AIX™, UNIX™, DOS™, MVS™ etc. A preferred embodiment of the present invention is generally implemented using a compiler program 118 executed under the control of the operating system 116. In the preferred embodiment, the compiler 118 conforms to ANSI COBOL or PL/I language conventions, although those skilled in the art will recognize that the compiler 118 could also conform to other language conventions without departing from the scope of the present invention.

The compiler 118 performs an analysis of a source program 120 containing source code in the form of source language statements, wherein the source program 120 is generally stored in a text file on one or more of the data storage devices 106 or is read from one or more of the data communications devices 108 or is entered interactively by a programmer from the keyboard 114. The compiler 120 then synthesizes an object program 122 from the source language statements in the source program 120.

In yet further preferred embodiments, an interpreter is employed instead of a compiler, wherein the interpreter interprets the source code (or a tokenized form of the source code) and performs the computations requested in the source code and modified source code statements directly, as opposed to generating an object code that in turn performs the requested computations when it is subsequently executed.

As discussed in more detail below, according to preferred embodiments of the present invention, a programmer (or user) may use extensions built into standard language conventions to enter source language statements into the source program 120 that specify a solution to the year 2000 problem. In preferred embodiments, these source language extensions comprise extensions or modifications to certain data definition statements existing in the source program 120. These source language extensions, when recognized by the compiler 120, result in the generation of an object program 122 containing instructions for performing data comparisons and computations in a manner that avoids the year 2000 problem.

As described above, the source code may be processed in accordance with further preferred embodiments of the invention, by an interpreter, as opposed to a compiler. Such further embodiments preferably function similar to compiler embodiments, except that an interpreter performs computations requested in the source code directly, rather than first converting the source code into object or compiled code that performs the requested computations when it is subsequently executed. However, for purposes of simplifying the present disclosure, embodiments are described herein primarily with reference to compiler-based systems. One skilled in the art will understand that, where appropriate, the descriptions herein relating to compiler systems, compiler options and compiler functions and operations are applicable to interpreter systems, options, functions and operations as well.

Generally, the operating system 116, compiler 118, source program 120, and object program 122, which contribute to the implementation of the preferred embodiment of the invention, are embodied in, or readable from, a computer-readable medium or carrier, e.g., one or more of the fixed and/or removable data storage data devices 106 and/or data communications devices 108 connected to the computer 100. Under control of operating system 116, the compiler 118, source program 120, and object program 122 may be loaded from the data storage devices 106 or data communications devices 108 into the memory 104 of computer 100. Further, the operating system 116, compiler 118, and object program 122 comprise instructions which, when read and executed by computer 100, cause the computer 100 to perform the steps necessary to execute the steps or elements of the present invention.

According to preferred embodiments of the present invention, certain data declaration statements for year data and date data fields in the source program 120 are configured to include extensions requesting a particular year 2000 solution technique. In addition, the compiler 118 is configured to process year values in date fields of the source code, in accordance with the technique requested by the extensions to the declaration statements. More specifically, the compiler 118 is configured to recognize such extensions to a declaration and generate an object program 122 containing instructions for performing operations on the data fields associated with the declaration, in the manner that employs the requested technique for avoiding the year 2000 problem. Thus, preferred embodiments involve both compiler configurations and source code configurations, either or both of which are preferably achieved by minimal modifications to existing source programs and compilers.

Those skilled in the art will recognize that the exemplary environment illustrated in FIG. 1 is not intended to limit the present invention. Indeed, those skilled in the art will recognize that other alternative hardware environments may be used without departing from the scope of the present invention.

SOURCE PROGRAM ENHANCEMENTS

As noted above, embodiments of the present invention involve source code extensions to declaration statements which may be written as part of an original source program. However, in preferred embodiments, the source code configurations employed with the present invention involve minimal modifications to existing source programs made, for example, by a programmer, preferably using standard analysis and editing tools.

More specifically, certain data declaration statements in the source code are modified, using standard language conventions, to add extensions which specify a selected solution to the year 2000 problem. The selected solution may be, for example, any of the above-discussed windowing, compression or expansion techniques. However, other suitable techniques may be similarly specified. In preferred embodiments, no further modifications to the source code, and no modifications to the application logic or data files are typically necessary. Limiting the programmer-required modifications to, primarily, data definitions statements (or declarations) in the source code can minimize the complexity, cost, conversion time and error rate associated with the implementation of a year 2000 solution. Indeed, such limited source code modifications may be made with the aid of conventional analysis tools. In addition, the use of data definition statements renders it possible for the compiler to readily generate the desired code in most situations and flag ambiguous statements when they occur.

Figure 2:
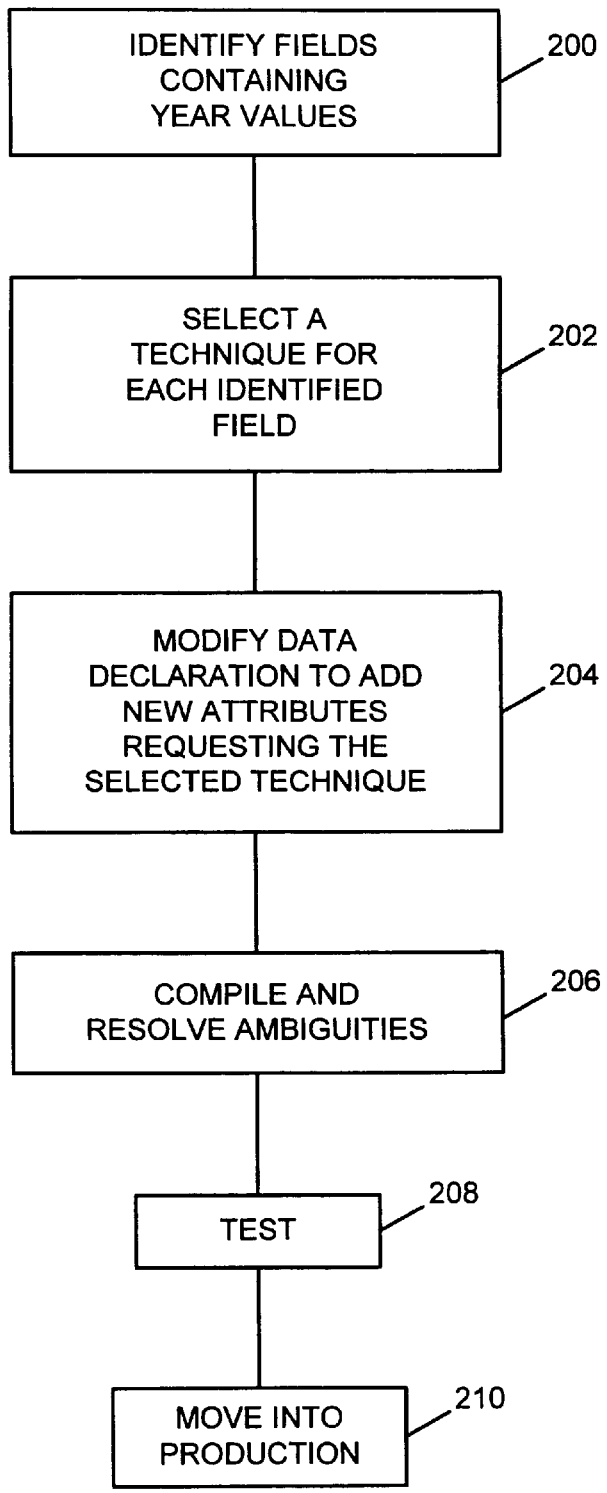
FIG. 2 is a flowchart that illustrates a general process for implementing a year 2000 solution in accordance with a preferred embodiment of the present invention.

An example procedure for effecting such source code modifications in accordance with a preferred embodiment of the invention, is shown in FIG. 2. In particular, the procedure illustrated in FIG. 2 involves a step 200 of identifying the fields in the source code that contain year and date values. Preferably, this step is carried out by the programmer, using standard, conventional analysis tools, including, but not limited to the compiler 118.

In step 202, for each field identified in step 200, the programmer determines and selects an appropriate technique for addressing the year 2000 problem, such as expansion, windowing or compression. The selection may be based on the programmer's preference and/or may be dictated by the constraints of the program, hardware or environment of use.

Once an appropriate technique has been selected for a particular field, the programmer modifies the data declaration for that field. The modification involves "decorating" the declaration by the addition of new attributes to the data definition, to identify the type of date field and to request the selected technique. In this manner, as shown as step 204, the declaration statement associated with each field identified in step 200 is modified (or decorated) with new attributes associated with a selected technique, such as windowing, compression, expansion, etc.

Thereafter, as shown in step 206, the compiler 118 compiles the source program, with the modifications made thereto. Any ambiguous references may be resolved at this stage. For example, during compilation, the compiler 118 identifies potential ambiguities relating to date fields, such as, for example, comparisons, additions or multiplications of date field information with information or values that are not date fields.

In preferred embodiments, the compiler 118 includes a routine or set of preset rules for identifying such potential ambiguities and, upon identification, for notifying the programmer of such potential ambiguities (e.g., using the monitor 110 or other suitable visual or audible means). In further preferred embodiments, the compiler 118 makes assumptions and modifications relating to the potential ambiguities based on the preset rules.

The step of notifying the programmer of the potential ambiguities allows the programmer to make further appropriate modifications to the related field, if necessary, to resolve the ambiguity. Alternatively, the programmer may determine that the potentially ambiguous statement (or an assumption and modification made by the compiler 118) is, actually, proper and, therefore, may choose to ignore the compiler's potential ambiguity notification. In typical applications, the number of potential ambiguities should be minimal. Thus, in preferred embodiments, an additional set of intrinsic functions (or built-in functions) along with the compiler, may be used by the programmer to facilitate corrections of ambiguous or erroneous statements.

Once the potential ambiguities are resolved (or ignored) pursuant to step 206, the source program 120 may then be tested (step 208) and moved into production in its normal operating environment (step 210).

The compiler preferably provides facilities, controlled by a compiler option, to flag not only ambiguous statements, but all statements that have been affected by the source code modifications made in accordance with the present process. More specifically, according to such further embodiments, a compiler option is provided to request the generation of informational, warning, and/or error messages for each source statement affected by the addition of new attributes to the data declaration statements made in accordance with the present process. These messages provide the programmer with additional information useful in understanding the effects of modifications made to the program.

The testing step 208 (or, alternatively, the compile and resolve step 206) may include an analysis process carried out with the use of debugger hooks, or the like, inserted by the compiler into the generated code, to allow user-verification of all affected statements in the source code. The compiled program with debugger hooks inserted may be run in conjunction with a debugger or other run-time analysis tool to facilitate testing.

The testing step 208 may involve additional run-time analysis to validate the decisions and identify possible run-time conflicts. For example, if it is known that a particular variable uses a particular value as a flag, run-time analysis can be done to check for places where the variable is compared to this value or set to this value when the value is not a constant but is contained in another variable.

In preferred embodiments, the process of FIG. 2 is conducted on a source program 120 (FIG. 1), on a module-by-module basis. For example, a source program may be composed of a plurality of modules, and the modules may be processed, one at a time, in any desirable sequence. In such an embodiment, for each module, step 210 involves merging the module back into the source program, after processing and testing of the module in accordance with steps 200–208.

Moreover, in further preferred embodiments the compiler is provided with a disabling option which allows a programmer to disable the use of the new attributes added in step 206. In accordance with such embodiments, each module may be modified and tested individually as noted above, and then the program may be recompiled with the disable compiler option to disable the use of the new attributes. As each module is processed, it may then be merged into production, with the usage of the new attributes disabled. This feature also allows a programmer to modify the source program in portions, e.g., module by module, while allowing the overall source program to remain operational. Thus, the source program may remain operational by controlling the compiler routine to disable the new modifications during the periods of time in which some portions of the source program have been modified and merged back into the program, while other portions have not yet been modified. As a result, the conversion time necessary for making the above-noted modifications to the source program may be minimized.

As a further feature of preferred embodiments employing a windowing technique, an option is provided for setting a default window (or for setting all of the individual windows, in a multiple window program) with a setting of 1900 to 1999. This, allows the program to run with the window(s) set to correspond to the period for which the source program was intended to operate prior to modifications (i.e., prior to the turn of the century). This procedure allows the programmer to test the operability of the modified source program, by comparing the results obtained from running the modified program with the window(s) set at the 1900 to 1999 values, with the results obtained from running the pre-modified program. The results should be the same for both runs. After such comparison, the window(s) may be changed from the 1900 to 1999 setting to the appropriate setting selected by the programmer.

Thus, the 1900 to 1999 setting allows the programmer to, for example, test the operability of the modified source program, after modifications have been added thereto. In addition, this feature allows a programmer to operate the modified source program (in effect, without modifying the result, with respect to the result that would be obtained with the source program prior to modification) until it is desirable to begin using the modified version (e.g., when date fields in the original source program will begin to be affected by the year 2000 problem). At that time, the programmer need only specify a new window (or multiple new windows for multiple window programs).

SOURCE LANGUAGE ENHANCEMENTS

As representative examples, various source language extensions for requesting year 2000 solution techniques are described herein. Although preferred embodiments of the present invention may incorporate any or all of the above-noted standard year 2000 techniques, the description herein will, for simplicity, concentrate primarily on extensions using fixed and multiple windowing and expansion. Similarly, while preferred embodiments of the present invention may be implemented for a variety of computer languages such as, but not limited to, COBOL, PL/I, and C++, for simplicity, the description herein and examples provided will use a syntax consistent with an extended standard COBOL language syntax.

In accordance with preferred embodiments of the present invention, extensions are provided to the existing standard source language, for example, COBOL or PL/I. These source language extensions provide the syntax used to decorate data declaration statements that define date related data items.

As a representative example, a DATE-FORMAT attribute with values chosen from the set YYMMDD, YYYYMMDD, YYDDD, YYYYDDD, YY, YYYY, "MMDDYY" and "DDMMYYYY" is provided with the source language extensions of the present invention to allow the programmer to specify the format of date related data fields. DATE-FORMAT IS YYMMDD, for example, specifies that the associated data item contains a date item (sometimes referred to as a calendar date) with a 2-digit year, a 2-digit month, and a 2-digit day; YYYYDDD specifies that the associated data item contains a date item (sometimes referred to as an ordinal date) with a 4-digit year and a 3-digit day-of-year; and YY specifies that the associated data item contains a date data item consisting only of a 2-digit year.

Those skilled in the art will recognize that the examples quoted above are not intended to limit the present invention. Indeed, those skilled in the art will recognize that other date formats and syntaxes for representing date formats may be used without departing from the scope and spirit of the present invention. Furthermore, time attributes, for example, hours, minutes, seconds may also be included in additional date formats.

In addition to the DATE-FORMAT attribute for date data items, a WINDOW attribute is also provided in preferred embodiments of the present invention to allow specification of fixed window values associated with individual date data items that contain 2-digit years. The WINDOW attribute uses a syntax of WINDOW(low-value, high-value), where low-value specifies the first year in the 100 year fixed window and high-value specifies the last. For example, the following data declaration:

01 BIRTH-DAY PIC 9(6) DATE-FORMAT IS YYMMDD,
WINDOW(1920, 2019).

declares a field called BIRTH-DAY that contains six numeric digits: 2 year digits, 2 month digits, and 2 day digits. The year digits in the BIRTH-DATE field are to be interpreted within the fixed window of 1920 to 2019.

The DATE-FORMAT and WINDOW attributes may be applied to any data item which contains a digital representation of a date including but not limited to data items encoded using BINARY, DISPLAY, and PACKED-DECIMAL data formats. Those skilled in the art will recognize that other date representations and data formats may be used without departing from the scope of the present invention.

As a further example of how a COBOL program might be enabled for the year 2000, using the compiler-assisted techniques described herein, consider the following COBOL program fragment:

```
01 PERIOD PIC 99.
01 TODAYS-DATE.
    05 TODAY-YY PIC 99.
    05 TODAY-MM PIC 99.
    05 TODAY-DD PIC 99.
01 POLICY-RECORD.
 . . .
    05 MATURITY-DATE.
        10 MATURITY-YY PIC 99.
        10 MATURITY-MM PIC 99.
        10 MATURITY-DD PIC 99.
 . . .
*     If policy is mature, update benefits record . . .
    ACCEPT TODAYS-DATE FROM DATE
    IF MATURITY-DATE IS GREATER THAN OR EQUAL TO
    TODAYS-DATE
DISPLAY "Policy maturity date: 19" MATURITY-YY
    SUBTRACTION MATURITY-YY FROM TODAY-YY
    GIVING PERIOD
 . . .
```

Based on the source program modifications discussed herein, the following steps are used to convert the program fragment above. First, in accordance with step 200 in FIG. 2, standard static analysis tools are used to determine that the data items, PERIOD, TODAYS-DATE, TODAY-YY, MATURITY-DATE and MATURITY-YY, are date impacted. Inspection of the date impacted program statements also shows that the DISPLAY statement explicitly assumes that the current date is in the twentieth century, so that, even in the year 2002, it would print, "Policy maturity date: 1902"

In accordance with step 202 in FIG. 2, the same tools may then be used to determine that a reasonable solution would be to use windowing for the existing date data items, and introduce a new, expanded data item for correctly displaying the current year. Next, in accordance with step 204 of FIG. 2, the date and year attributes are added and the code is modified as follows:

```
1.   01 THIS-YEAR PIC 9999 DATE-FORMAT YYYY
        WINDOW(1950,2049).
     01 PERIOD PIC 99.
2.   01 TODAYS-DATE DATE-FORMAT YYMMDD
        WINDOW(1950,2049).
  1.      05 TODAY-YY PIC 99 DATE-FORMAT
            YYWINDOW(1950,2049).
          05 TODAY-MM PIC 99.
          05 TODAY-DD PIC 99.
     01 POLICY-RECORD.
     . . .
  2.      05 MATURITY-DATE DATE-FORMAT YYMMDD
            WINDOW(1950,2049).
  2.         10 MATURITY-YY PIC 99 DATE-FORMAT YY
                WINDOW(1950,2049).
             10 MATURITY-MM PIC 99.
             10 MATURITY-DD PIC 99.
     . . .
     *     If policy is mature, update benefits record . . .
           ACCEPT TODAYS-DATE FROM DATE
3.         IF MATURITY-DATE IS GREATER THAN OR EQUAL TO
              TODAYS-DATE
4.            MOVE TODAYS-YY TO THIS-YEAR
              DISPLAY "Policy maturity date: " THIS-YEAR
5 5.          SUBTRACT MATURITY-YY FROM TODAY-YY
                 GIVING PERIOD
     . . .
```

Refer to the numbered keys in the modified program fragment above, representing the steps by which the modification was made, and assume that the single, fixed window for the program is from 1950 through 2049, inclusive. In step 1, a new, expanded data item THIS-YEAR is introduced, so that the current year can be correctly displayed. In step 2, the existing data items are decorated with the appropriate date attributes. In step 3, the comparison of the decorated dates proceeds as if the year components of both dates were in the range 1950 through 2049, such that a year value of 2 would be interpreted as 2002, rather than as 1902 in the unmodified program. In step 4, TODAYS-DATE is correctly expanded to a four-digit year. In step 5, the difference between the two windowed year values, TODAY-YY and MATURITY-YY, is computed as if data values from 0 through 49 were augmented by 100, and processed as 100 through 149.

As noted above, the compiler 118 preferably conforms to ANSI COBOL or PL/I language conventions, although those skilled in the art will recognize that the compiler 118 could also conform to other language conventions without departing from the scope of the present invention. In addition, Section A hereto is a COBOL specification document which describes further details relating to preferred embodiments implemented with COBOL compilers, and Section B hereto is a PL/I specification document which describes further details relating to preferred embodiments implemented with PL/I compilers.

COMPILER OPTIONS EXTENSIONS

As representative examples, various compiler options extensions for requesting year 2000 solution techniques are described herein. Although preferred embodiments of the present invention may incorporate any or all of the above-noted standard year 2000 techniques, the description herein will, for simplicity, concentrate primarily on extensions using fixed and multiple windowing and expansion. Similarly, while preferred embodiments of the present invention may be implemented for a variety of computer languages such as, but not limited to, COBOL, PL/I, and C++, for simplicity, the description herein and examples provided will use a syntax consistent with extensions to existing COBOL compiler options.

Implementation of the preferred embodiments of the present invention, for example, in a COBOL or PL/I compiler and run-time library requires enhancements to provide support for new compiler options to allow specification of a default window, specification of the types of messages that should be produced as a result of the insertion of enhanced data definition attributes in the source code, and the ability to enable or disable the processing of the enhanced data definition attributes in the source program.

The new compiler option YEARWINDOW(low-value, high-value) is used to specify a default fixed window for date data items in the source program which are recorded with a 2-digit year format and where no WINDOW attribute is specified for the data item. For example,

01 BIRTH-DAY PIC 9(6) DATE-FORMAT IS YYMMDD.

defines a date data item which contains a 2-digit year. However, since no WINDOW attribute is specified in the data declaration, the necessary low and high values for the window are obtained from the values provided in the YEARWINDOW compiler option, assuming it is specified. If the YEARWINDOW compiler option is not specified, or if a NOYEARWINDOW compiler option is specified, then statements such as the one shown above are flagged by the compiler as an error because no window value is provided.

If WINDOW attributes are left off all date data declaration statements in a source program, use of the YEARWINDOW compiler option allows specification of a single fixed window to be used for all date data items with 2-digit years.

The new compiler options FLAGDATE and NOFLAGDATE specify that the compiler is to produce or omit informational and/or warning messages for each statement in the compilation unit that uses or is affected by the year 2000 language extensions. Error messages flagging incorrect source language statements detected by the compiler are produced irrespective of the specification of the FLAGDATE/NOFLAGDATE compiler options.

The new compiler options DEBUGDATE and NODEBUGDATE specify that the compiler is to produce or omit debug hooks in the generated code for each source statement in the compilation unit that uses or is affected by the year 2000 language extensions.

Those skilled in the art will recognize that the examples of compiler options described above are not intended to limit the present invention. Indeed, those skilled in the art will recognize that additional and alternative compiler options may be used without departing from the scope of the invention.

COMPILER SUPPORT

In accordance with preferred embodiments of the present invention, compiler support is provided for recognizing and processing the above-noted extension statements and other instructions, such as instructions for disabling data definition attribute extensions (as discussed above with respect to the "disabling" option), instructions for setting a default window (as discussed above with respect to the "YEARWIN- DOW" option), instructions for a debugger routine as discussed above, etc. These support features may be written as part of a compiler program and run-time library specifically designed to support the original language and these enhancements. However, in preferred embodiments, existing compiler programs and run-time libraries will be upgraded or enhanced to support the recognition and processing of these source language enhancements and other instructions in a manner discussed herein.

Implementation of the preferred embodiments of the present invention, for example, in a COBOL or PL/I compiler and run-time library preferably involves enhancements to provide support for new compiler options, support for new data declaration date attributes, support for new intrinsic or built-in functions, enhanced code generation facilities to support the extended semantics and debug hooks, new or enhanced run-time library routines, and new or enhanced intrinsic functions. Enhancements to a COBOL or PL/I compiler to provide support for these functions may be readily implemented, using standard programming techniques.

With regard to the support for new compiler options, the YEARWINDOW/NOYEARWINDOW, FLAGDATE/NOFLAGDATE, and DEBUGDATE/NODEBUGDATE compiler options as described above, may be readily implemented by one skilled in the art of compiler implementation.

With regard to the new data declaration date attributes, typical implementation in a COBOL or PL/I compiler includes recognition of the new syntax, recognition and reporting of syntactic and semantic errors resulting from the introduction of the new attributes, and recording the new data attributes in the program symbol table. Such processing is consistent with the introduction of a new data type into the language or the introduction of new attributes for existing data types and is well known to those skilled in the art of compiler implementation.

With respect to the enhanced code generation facilities and new or enhanced run-time library routines, source program statements which involve the processing of date data items can be recognized by the compiler using the new attribute information recorded in the program symbol table. When an affected data item is referenced in the body of a program for the purpose of carrying out a computation, its value is accessed and converted to a representation suitable for the specified computation. For example, if the computation specifies a comparison between a windowed date and an expanded date (with a 4-digit year), the windowed date, when accessed, could be expanded to a date with a 4-digit year so the comparison may be carried out using that representation as a common format. Similarly, if the source program specifies a date data item to be stored in a windowed date field (for example in a data move or as the result of a computation), the date data is converted to a format suitable for the receiving field using the window parameters for the receiving field as specified in the symbol table. In the process of converting the date data to the desired result format, if error handling (in COBOL, "ON SIZE ERROR") was specified, code is preferably generated to determine whether an error had occurred (that is, whether the converted date was outside the valid range of valid dates for the windowed receiving field), and if it had occurred, an appropriate error handling routine is preferably invoked.

These examples illustrate a few of a variety of techniques that could be used by those skilled in the art of compiler implementation to implement the necessary enhancements to the code generation and run-time library facilities in support of the new function. Additional examples are described in the attached appendices.

The compiler is also provided with support for new intrinsic functions (or built-in functions, in the case of PL/I). Examples of such functions and appropriate implementations are described in Section A and Section B below.

OTHER TECHNIQUES

Approaches as discussed above may be readily implemented with a "sliding window" technique, with minimal extensions to the basic technique. In this implementation, the window is defined as an offset from the current year. For example, a data item could be defined as windowed from 30 years prior to the current year to 69 years after the current year. Thus, for such an example, the sliding window technique may be implemented, as discussed above, by extending the syntax for the operand of the WINDOW attribute as follows:

DATE-FORMAT IS YY WINDOW(*-30,+69)

In addition, the run-time initialization changes to save the value of the current year minus 1900 at the start of execution. (Assume that this value is saved in Start Year.)

Furthermore, the sliding window technique requires codification of the algorithm used to convert a 2-digit year value into a form suitable for computations in conjunction with other date data items. In this case, the algorithm used for fixed windows (if value<lowrange) is still used but the "low-value" is now the value saved during initialization (described in the previous step) minus the delta specified in the WINDOW attribute.

The basic approaches described herein may also be expanded to variable window techniques. According to the variable window technique, a window is specified when the program is run, rather than when it is compiled. In this regard, a new window may be specified each time the program is run.

A compression technique could also be easily supported with a few extensions to the basic technique. Any of the popular compression algorithms could be used in conjunction with the technique. However, for purposes of simplifying the present disclosure, it is assumed that the selected compression algorithm operates to compress values which are treated as offsets from 1900 and compresses values in the range of 0 to 499. Compression algorithms which do not adhere to these restrictions could also be handled with further modifications to the basic approach.

Additional support for implementing a compression technique would include a new modifier for the YY attribute, to indicate that compression is to be used instead of windowing. For example, the following modifier may by used:

DATE-FORMAT YY COMPRESSED

If it were desirable to support more than one compression algorithm, support could be implemented, for example, by extending the basic compression syntax to allow the selection of a specific compression algorithm. For example:

DATE-FORMAT YY COMPRESSED(algorithm).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

Section A

What is claimed is:

1. A method of processing a computer source program, comprising the steps of:

providing a data declaration extension syntax, wherein the syntax comprises use of DATE-FORMAT to identify the data declaration extension to a compiler and provides keywords for identifying one of a plurality of windowing techniques and provides fields for specifying ranges of years;

receiving a plurality of programming language statements comprising a source program into a memory of a computer, wherein at least one of the received statements comprises a data declaration extension requesting a Year 2000 solution selected from a plurality of windowing techniques, and wherein the data declaration extension is in a format of the provided data declaration extension syntax; and compiling the source program into an object program in the memory of the computer, wherein the object program includes instructions for processing and/or invoking procedures on a data field associated with the extended data declaration according to the Year 2000 solution requested in the data declaration.

2. A method as recited in claim 1, further comprising the steps of:

(a) identifying data declaration statements relating to year values in date fields of the source program; and (b) modifying at least one identified data declaration statement to add an extension requesting a Year 2000 solution to be applied to the year value associated with the statement; and wherein said step of receiving, further comprises the step of storing the modified data declaration statement in the memory of the computer.

3. A method as recited in claim 2, wherein said step of modifying at least one identified data declaration statement comprises the steps of:

(a) defining a date field format in at least one identified data declaration statement; and (b) adding a request for a Year 2000 solution in said at least one identified data declaration statement.

4. A method as recited in claim 3, wherein said step of defining a date field format comprises the step of:

selecting a date field format from the group consisting of YYMMDD, YYYYMMDD, YYDDD, YYYYDDD, MMDDYY, DDMMYYYY, YY, and YYYY;

where YYMMDD specifies that a data item associated with the date field contains a 2-digit year, a 2-digit month, and a 2-digit day representation;

where YYYYMMDD specifies that a data item associated with the date field contains a 4-digit year, a 2-digit month, and a 2-digit day representation;

where YYDDD specifies that a data item associated with the date field contains a 2-digit year and a 3-digit day representation;

where YYYYDDD specifies that a data item associated with the date field contains a 4-digit year and a 3-digit day representation;

where MMDDYY specifies that a data item associated with the date field contains a 2-digit month, a 2-digit day, and a 2-digit year representation;

where DDMMYYYY specifies that a data item associated with the date field contains a 2-digit day, a 2-digit month, and a 4-digit year representation;

where YY specifies that a data item associated with the date field contains a 2-digit year representation; and where YYYY specifies that a data item associated with the date field contains a 4-digit year representation.

5. A method as recited in claim 1, wherein said step of compiling comprises the steps of:

recognizing said at least one statement comprising a data declaration extension requesting a Year 2000 solution;

recognizing at least one source program statement which involves the processing of date items in data fields affected by said data declaration extension; and generating object program instructions for performing operations on data fields associated with the data declaration extension in a manner that employs the requested Year 2000 solution.

6. A method as recited in claim 5, wherein said data declaration extension comprises a Year 2000 solution attribute and wherein said method further comprises the step of recording said Year 2000 solution attribute in a compiler program symbol table.

7. A method of processing a computer source program, comprising the steps of:

providing a data declaration extension syntax, wherein the syntax comprises use of DATE-FORMAT to identify the data declaration extension to a interpreter and provides keywords for identifying one of a plurality of windowing techniques and provides fields for specifying ranges of years;

receiving a plurality of programming language statements comprising a source program into a memory of a computer, wherein at least one of the received statements comprises a data declaration extension requesting a Year 2000 solution selected from a plurality of windowing techniques, and wherein the data declaration extension is in a format of the provided data declaration extension syntax; and (b) processing the source program with an interpreter, including invoking procedures on a data field associated with the extended data declaration according to the Year 2000 solution requested in the data declaration.

8. A method as recited in claim 7, further comprising the steps of:

(a) identifying data declaration statements relating to year values in date fields of the source program; and (b) modifying at least one identified data declaration statement to add an extension requesting a Year 2000 solution to be applied to the year value associated with the statement; and wherein said step of receiving comprises storing the modified data declaration statement in the memory of the computer.

9. A method as recited in claim 7, wherein said step of processing comprises the steps of:

recognizing said at least one statement comprising a data declaration extension requesting a Year 2000 solution;

recognizing at least one source program statement which involves the processing of date items in data fields affected by said data declaration extension; and performing operations on data fields associated with the data declaration extension in a manner that employs the requested Year 2000 solution.

10. A computer programming apparatus, comprising:

a computer having a memory;

means, performed by the computer, for providing a data declaration extension syntax, wherein the syntax comprises use of DATE-FORMAT to identify the data declaration extension to a compiler and provides keywords for identifying one of a plurality of windowing techniques and provides fields for specifying ranges of years;

means, performed by the computer, for receiving a series of programming language statements comprising a source program into a memory of the computer, wherein at least one of the received statements comprises a data declaration extension requesting a Year 2000 solution selected from a plurality of windowing techniques, and wherein the data declaration extension is in a format of the provided data declaration extension syntax; and means, performed by the computer, for compiling the source program into an object program in the memory of the computer, wherein the object program includes instructions for processing and/or invoking the procedures on a data field associated with the extended data declaration according to the Year 2000 solution requested in the declaration.

11. Apparatus as recited in claim 10, further comprising:

(a) means, performed by the computer, for identifying data declaration statements relating to year values in date fields of the source program; and (b) means, performed by the computer, for modifying at least one identified data declaration statement to add an extension defining a Year 2000 solution to be applied to the year value associated with the statement; and wherein said means for receiving further comprises means, performed by the computer, for storing the modified data declaration statement in the memory of the computer.

12. Apparatus as recited in claim 11, wherein said means for modifying at least one identified data declaration statement comprises:

(a) means, performed by the computer, for defining a date field format in at least one identified data declaration statement; and (b) means, performed by the computer, for adding a request for a Year 2000 solution in said at least one identified data declaration statement.

13. Apparatus as recited in claim 12, wherein said means for defining a date field format comprises:

means, performed by the computer, for selecting a date field format from the group consisting of YYMMDD, YYYYMMDD, YYDDD, YYYYDDD, MMDDYY, DDMMYYYY, YY, and YYYY;

where YYMMDD specifies that a data item associated with the date field contains a 2-digit year, a 2-digit month, and a 2-digit day representation;

where YYYYMMDD specifies that a data item associated with the date field contains a 4-digit year, a 2-digit month, and a 2-digit day representation;

where YYDDD specifies that a data item associated with the date field contains a 2-digit year and a 3-digit day representation;

where YYYYDDD specifies that a data item associated with the date field contains a 4-digit year and a 3-digit day representation;

where MMDDYY specifies that a data item associated with the date field contains a 2-digit month, a 2-digit day, and a 2-digit year representation;

where DDMMYYYY specifies that a data item associated with the date field contains a 2-digit day, a 2-digit month, and a 4-digit year representation;

where YY specifies that a data item associated with the date field contains a 2-digit year representation; and where YYYY specifies that a data item associated with the date field contains a 4-digit year representation.

14. Apparatus as recited in claim 10, wherein said compiling means comprises:

means, performed by the computer, for recognizing said at least one statement comprising a data declaration extension requesting a Year 2000 solution;

means, performed by the computer, for recognizing at least one source program statement which involves the processing of date items in data fields affected by said data declaration extension; and means, performed by the computer, for generating object program instructions for performing operations on data fields associated with the data declaration extension in a manner that employs the requested Year 2000 solution.

15. Apparatus as recited in claim 14, wherein said data declaration extension comprises a Year 2000 solution attribute and wherein said apparatus further comprises means, performed by the computer, for recording said Year 2000 solution attribute in a compiler program symbol table.

16. An article of manufacture comprising a computer program carrier readable by a computer and embodying one or more instructions executable by the computer to perform method steps of programming a computer, the method comprising the steps of:

providing a data declaration extension syntax, wherein the syntax comprises use of DATE-FORMAT to identify the data declaration extension to a compiler and provides keywords for identifying one of a plurality of windowing techniques and provides fields for specifying ranges of years;

receiving a series of programming language statements comprising a source program into a memory of the computer, wherein at least one of the received statements comprises a data declaration extension requesting a Year 2000 solution selected from a plurality of windowing techniques, and wherein the data declaration extension is in a format of the provided data declaration extension syntax; and compiling the source program into an object program in the memory of the computer, wherein the object program includes instructions for processing and/or invoking the Year 2000 solution requested in the data declaration.

17. An article as recited in claim 16, further comprising the steps of:

(a) identifying data declaration statements relating to year values in date fields of the source program; and (b) modifying at least one identified data declaration statement to add an extension requesting a Year 2000 solution to be applied to the year value associated with the statement; and wherein said step of receiving comprises storing the modified data declaration statement in the memory of the computer.

18. An article as recited in claim 17, wherein said step of modifying at least one identified data declaration statement comprises the steps of:

(a) defining a date field format in at least one identified data declaration statement; and (b) adding a request for a Year 2000 solution in said at least one identified data declaration statement.

19. An article as recited in claim 18, wherein said step of defining a date field format comprises the step of:

selecting a date field format from the group consisting of YYMMDD, YYYYMMDD, YYDDD, YYYYDDD, MMDDYY, DDMMYYYY, YY, and YYYY;

where YYMMDD specifies that a data item associated with the date field contains a 2-digit year, a 2-digit month, and a 2-digit day representation;

where YYYYMMDD specifies that a data item associated with the date field contains a 4-digit year, a 2-digit month, and a 2-digit day representation;

where YYDDD specifies that a data item associated with the date field contains a 2-digit year and a 3-digit day representation;

where YYYYDDD specifies that a data item associated with the date field contains a 4-digit year and a 3-digit day representation;

where MMDDYY specifies that a data item associated with the date field contains a 2-digit month, a 2-digit day, and a 2-digit year representation;

where DDMMYYYY specifies that a data item associated with the date field contains a 2-digit day, a 2-digit month, and a 4-digit representation;

where YY specifies that a data item associated with the date field contains a 2-digit year representation; and where YYYY specifies that a data item associated with the date field contains a 4-digit year representation.

20. An article as recited in claim 16, wherein said step of compiling comprises the steps of:

recognizing said at least one statement comprising a data declaration extension requesting a Year 2000 solution;

recognizing at least one source program statement which involves the processing of date items in data fields affected by said data declaration extension; and generating object program instructions for performing operations on data fields associated with the data declaration extension in a manner that employs the requested Year 2000 solution.

21. An article as recited in claim 20, wherein said data declaration extension comprises a Year 2000 solution attribute and wherein said method further comprises the step of recording said Year 2000 solution attribute in a compiler program symbol table.

\* \* \* \* \*